Nov. 29, 1966  E. R. SWANSON  3,288,022
PHOTOREPRODUCTION DEVICE
Filed Oct. 4, 1963  7 Sheets-Sheet 1

INVENTOR:
ERNEST R. SWANSON
BY Charles B. Haverstock
ATTORNEY.

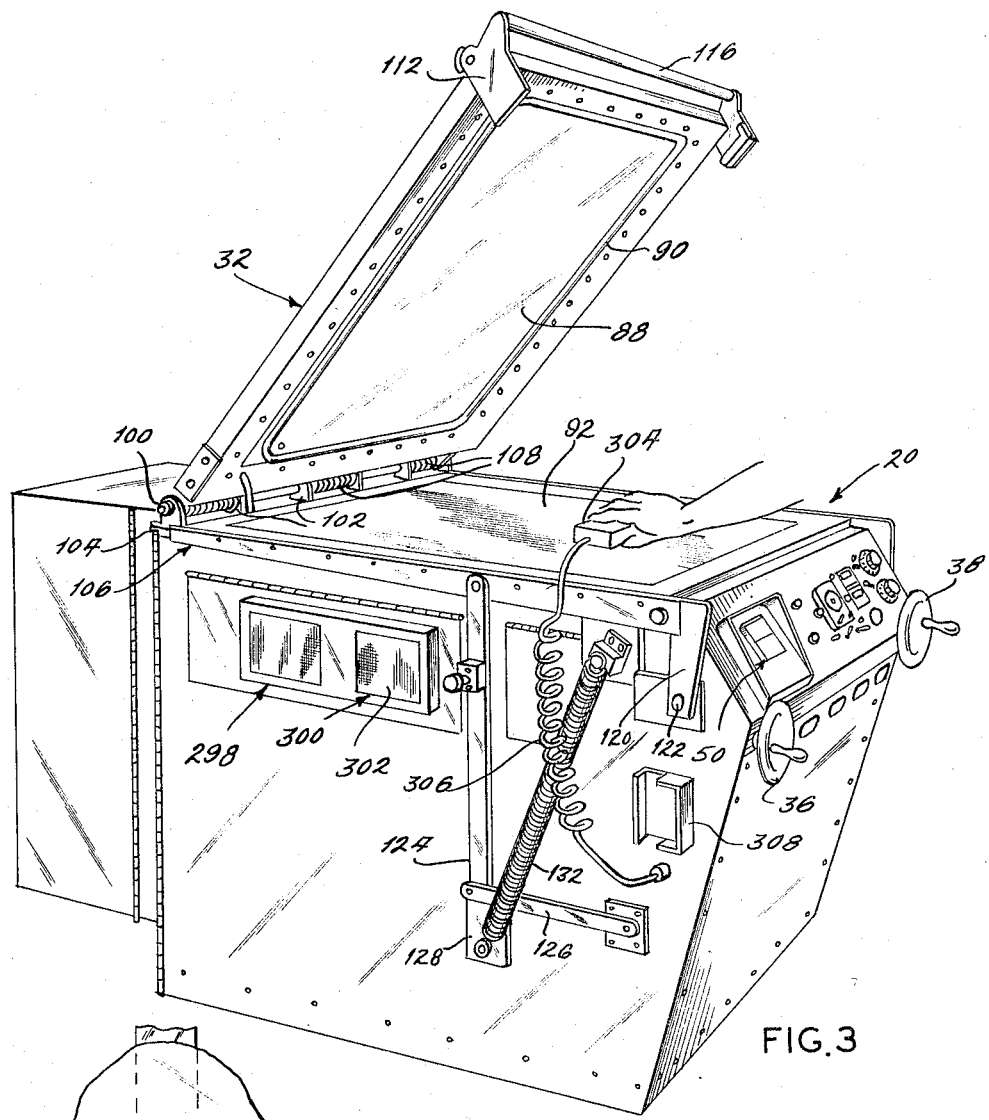
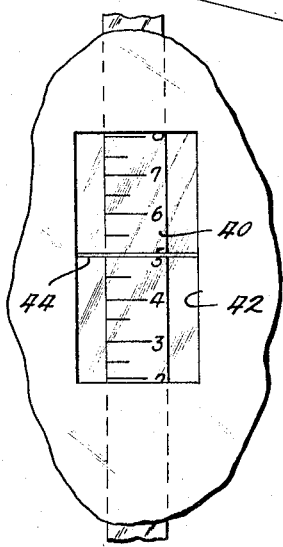
FIG. 3
FIG. 10
INVENTOR:
ERNEST R. SWANSON
BY Charles B. Haverstock
ATTORNEY, Nov. 29, 1966　　　E. R. SWANSON　　　3,288,022
PHOTOREPRODUCTION DEVICE Filed Oct. 4, 1963　　　　　　　　　　　　7 Sheets-Sheet 3

INVENTOR:
ERNEST R. SWANSON
BY Charles B. Haverstock
ATTORNEY.

INVENTOR:
ERNEST R. SWANSON
BY
Charles B. Haverstock
ATTORNEY.

Nov. 29, 1966  E. R. SWANSON  3,288,022
PHOTOREPRODUCTION DEVICE
Filed Oct. 4, 1963  7 Sheets-Sheet 6

INVENTOR:
ERNEST R. SWANSON
BY Charles B. Haverstock
ATTORNEY.

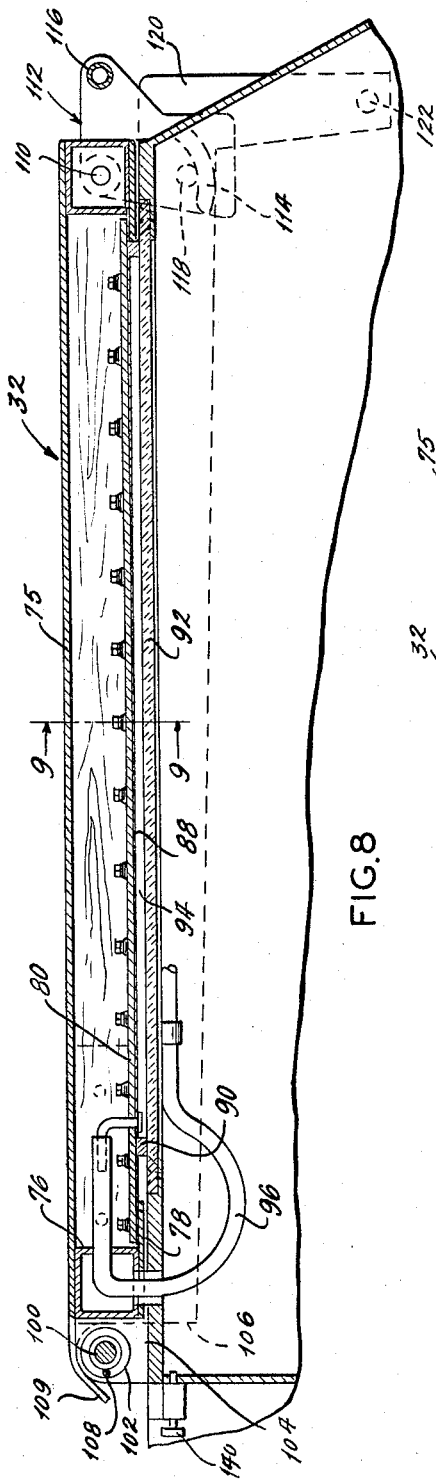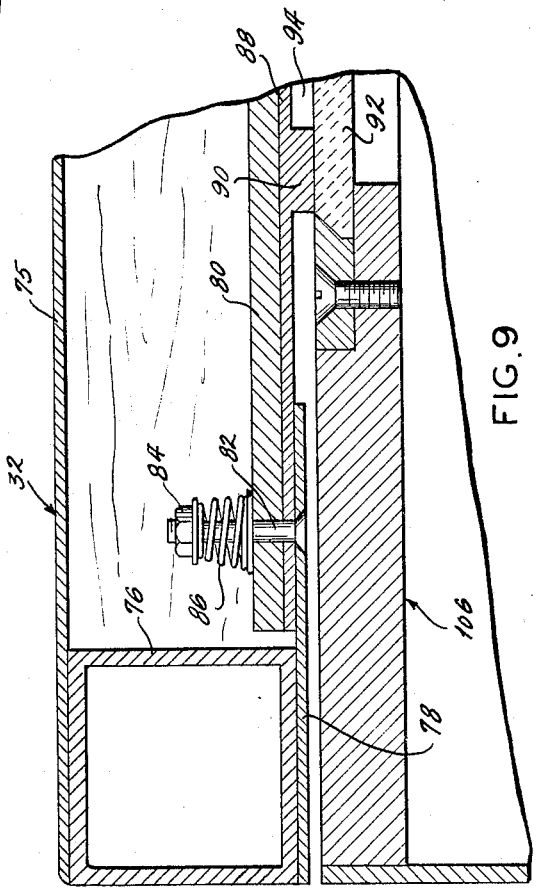

United States Patent Office 3,288,022
Patented Nov. 29, 1966

3,288,022
PHOTOREPRODUCTION DEVICE
Ernest R. Swanson, St. Louis, Mo.
(Rte. 1, Box 74, Defiance, Mo.)
Filed Oct. 4, 1963, Ser. No. 313,902
18 Claims. (Cl. 88—24)

The present invention relates generally to photoreproducing devices and the like and more particularly to a device for accurately copying, projecting, enlarging and contact exposing photosensitive material and the like and for making reproductions therefrom in suitable and desirable sizes and shapes.

It is common practice at the time of this writing to store records and other information on film to conserve storage space and to facilitate rapid retrieval and reproduction thereof as required. For many types of information such as office records and the like accurate photographic reproduction is not usually required so long as the material is reproducible, recognizable and easy to read. On the other hand, there are many situations where extreme reproductive acuity is required and where details, scale and proportion accuracy are essential. One place where such accuracy is required is in the reproduction and printing of cartographic, topographic, and aerial photographic information. There are also many other applications where similar accuracy is demanded and the named fields are not intended as an exhaustive list. It is in fields such as these that there is need for precision reproduction and printing equipment, and the present invention is designed primarily to satisfy these needs. It is not intended, however, to limit the present invention to use in any one of several fields since it can be used in many other fields and applications.

Information gained from an investigation of existing photoreproducing and printing devices has shown that all known miniature copy systems and devices have been made for purposes other than those requiring extreme acuity and accuracy. Consequently, all known systems are deficient in one way or another such as in their ability to accurately render enlarged pictures to precise scales and high acuity. These and other deficiencies of known equipment are further accentuated when the objects being reproduced have congested details. The known devices are also limited in their ability to automatically store and retrieve information making them unsuitable for many viewing, duplicating and data processing operations. Still further, none of the existing devices is as flexible and versatile as the present device.

Image quality tests on currently available equipment have also shown that in the smaller film sizes of the order of 35 mm. and less, the available equipment simply is not capable of reproducing congested details of maps, charts, aerial photographs and like materials with sufficient accuracy and acuity for reliable interpretation of such information.

It is therefore a principal object of the present invention to provide improved means capable of accurately and efficiently copying, projecting, enlarging, and retrieving information stored on films and other similar devices.

Another object is to improve the resolution, acuity and fidelity of information reproduced from films and the like.

Another object is to provide means capable of making extremely accurate enlargements of information stored on films.

Another object is to improve the resolution and reproduction accuracy and acuity of enlargements made from relatively small film sizes.

Another object is to provide more meaningful reproductions of information stored on film.

Another object is to provide a versatile photoreproduction device capable of copying, projecting, enlarging or reducing, exposing, and retrieving information stored on photographic devices such as films and the like.

Another object is to provide a photoreproduction device that can be operated by relatively unskilled personnel.

These and other objects and advantages of the present invention will become apparent after considering the following detailed specification of a preferred embodiment thereof in conjunction with the accompanying drawings wherein:

FIG. 3 is a perspective view similar to FIG. 1 but with the machine shown with the printing lid in one of its open positions;

FIG. 8 is an enlarged fragmentary cross-sectional view of the vacuum printing lid portion of the subject machine taken on line 8—8 of FIG. 5;

FIG. 9 is an enlarged fragmentary cross-sectional view taken on line 9—9 of FIG. 8;

FIG. 10 is an enlarged fragmentary view of the enlargement ratio control indicator means for the subject device;

Figure 1:
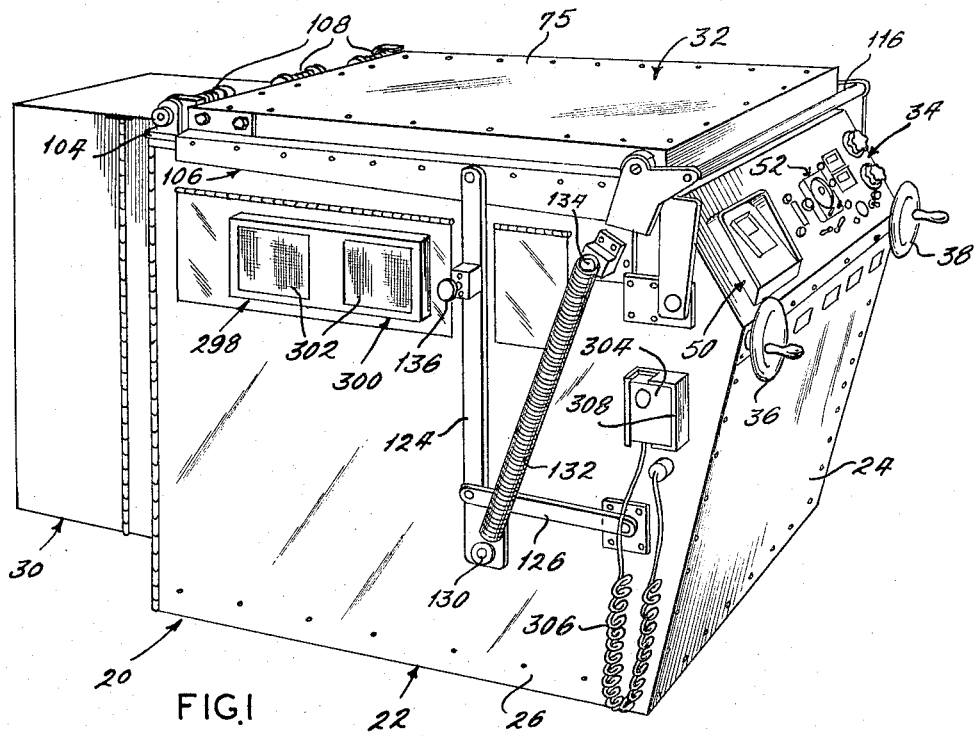
FIG. 1 is a perspective view of a photoreproducing device constructed according to the present invention.

Referring to the drawings more particularly by reference numbers, the number 20 refers generally to a multipurpose photoreproducing and printing machine constructed according to the present invention. The subject machine has many uses and applications. For example, it can be used as a copy camera, a projector, a viewer, a contact printer, an enlarger or reducer, for a data storage and retrieval device and for many other purposes.

The machine 20 includes a housing 22 with a front wall 24, side walls 26 and 28, a rear housing portion 30, and a movable closure lid 32. The upper portion of the front wall 24 is formed into a control panel 34 with suitable switches, dials, knobs and other controls which will be described hereinafter.

Included among the controls for the subject machine is a manual focus adjustment crank 36 which can be rotated in both directions and is used to focus a film image on an easel surface as will be shown. Another crank 38 is provided on the opposite side of the machine for manually adjusting a scale setting used to adjust the size of an enlargement or reduction to be made. The crank 38 is the fine adjustment control for adjusting the size of enlargement and is used in conjunction with a graduated ratio tape 40 that is visible through an opening 42 in the control panel 34 behind a hairline 44 (FIG. 10).

Two electrical scale adjustment control switches 46 and 48 are provided on the control panel and are shown as press type switches. The switch 46 is pressed to reduce the size of an image to be reproduced, and the switch 48 is pressed to increase or further enlarge the image. The switches 46 and 48 energize reversible drive means which will be described hereinafter.

An exposure meter 50 and suitable controls therefor, and an exposure timer device 52 are also mounted on the control panel and are of commercially available constructions.

A voltmeter 54 and associated switch 56 are provided to control and adjust the intensity of copy lights employed in the machine, and another voltmeter 58 and associated switch 60 are likewise provided to control the operation and intensity of a projector light bulb. Rheostats 62 and 63, respectively, are provided to vary the voltages and hence the intensity of the copy lights and the projection light bulb.

The machine 20 is also provided with a master control switch 64 and two switches 66 and 68 which respectively control the opening and closing of a camera shutter mechanism.

Figure 2:
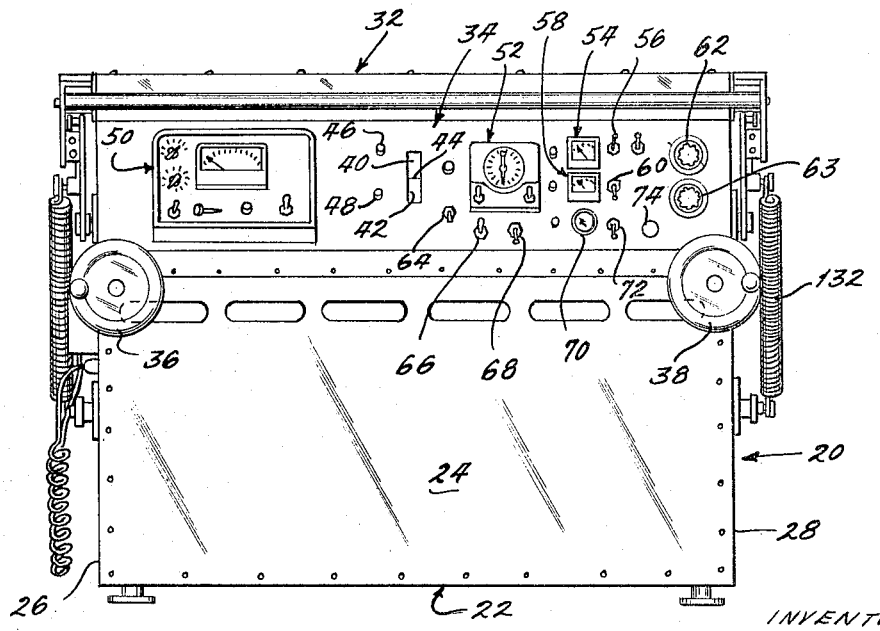
FIG. 2 is a front elevational view of the same device.
Figure 5:
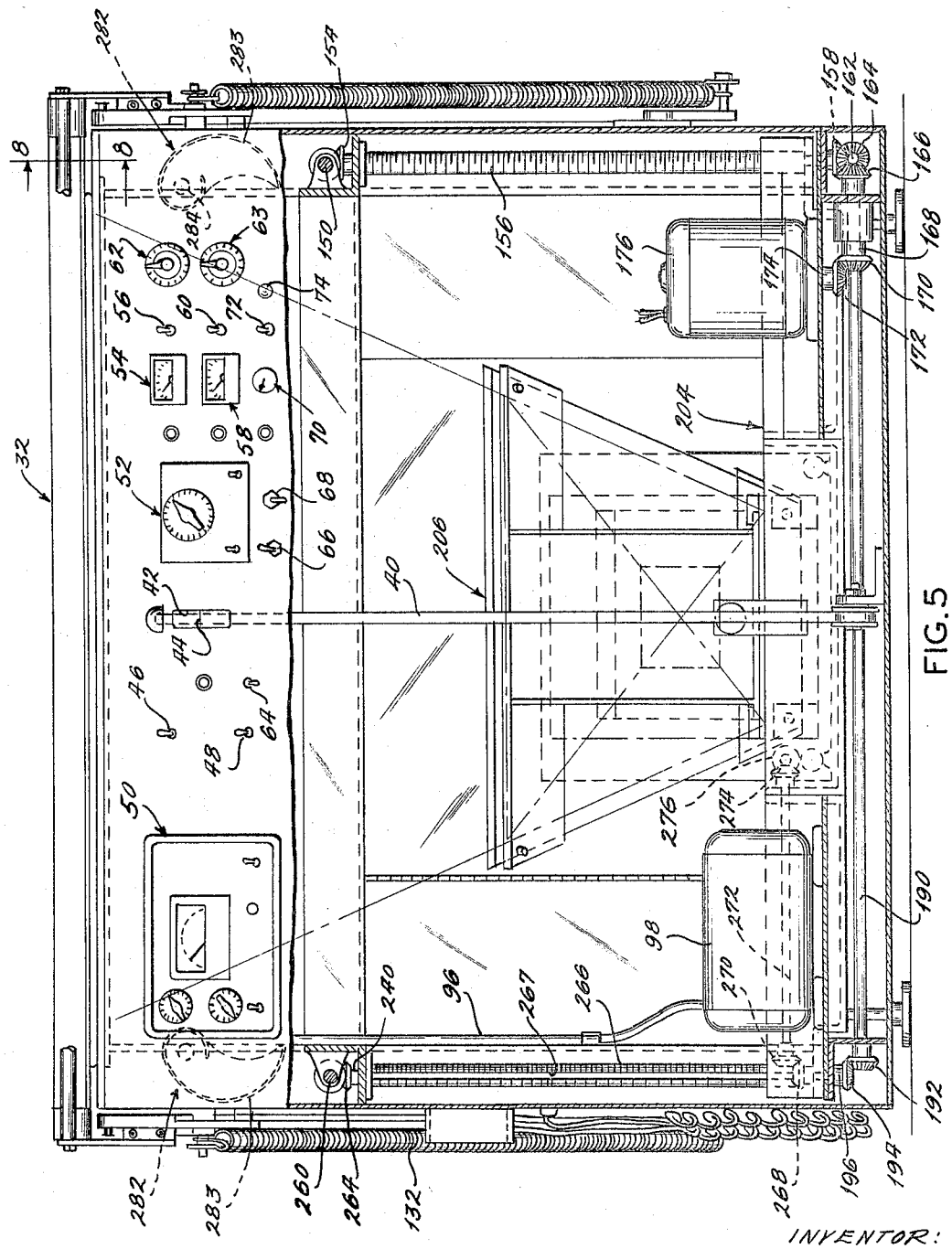
FIG. 5 is an enlarged front elevational view, partly cut away and sectioned to show the location and shape of some of the internal mechanism.

A vacuum gage 70 for use in conjunction with the printing lid 32 is also provided. The vacuum gage indicates the amount of suction applied to the printing lid 32 to hold a piece of photosensitive paper or film in a flat unwrinkled condition during exposure. The operation of the lid 32 will be described more in detail later on. Another switch 72 is provided to control the application of the vacuum pressure in the closure lid 32, and a release button 74 is provided to release the suction pressure when the lid is to be opened. The pressure release button 74 is depressed after the suction pressure switch 72 is turned off. The above described controls and switches are shown in FIGS. 2 and 5.

The closure lid 32 for the subject device is shown in detail in FIGS. 1, 3, 4, 7, 8 and 9 and includes an upper flat panel 75 with a square tubular member 76 attached to the underside thereof around the periphery. A flat peripheral member 78 is attached to the bottom side of the tubular member 76 and another wall member 80 is attached around the periphery to the member 78 by a plurality of bolts 82, nuts 84 and spring members 86 (FIG. 9) to form a yieldable lower wall for the lid 32. The wall 80 yields upwardly against the force of the spring 86.

A resilient flexible wall 88 is positioned below the yieldable wall 80 and is held in position thereagainst by having its edge portion clamped between the wall members 78 and 80. The wall 88 has a continuous downward extending bead portion 90 on the underside thereof, and the bead 90 sealably engages a glass top easel 92 when the lid 32 is closed as shown in FIGS. 8 and 9. When the lid is closed the wall 88, the bead 90 and the glass easel 92 form a sealed chamber 94 which is connected by a conduit 96 to the output of a suction pump 98. When the pump 98 is operated it evacuates the air from the chamber 94 and causes the flexible wall 88 to move downwardly against the clear glass easel 92. This in turn causes a paper, film or other printing media positioned between the wall 88 and the easel 92 to be flat. The flexible wall 88 could also be mounted along one side of the machine on a roller and pulled across the glass easel 92. In such a construction the operation would be substantially the same.

The lid 32 is hingedly mounted on a shaft 100 that extends through a plurality of spaced bearing members 102 mounted on a frame member 104. The frame member 104 is attached to the rear edge of a frame structure 106 which extends around the upper periphery of the machine and the frame structure 106 supports the glass easel. A plurality of coil springs 108 are mounted on the shaft 100 and are appropriately loaded to balance the lid 32 in raised position as shown in FIG. 3. Safety stops 109 are also provided along the rear edge of the lid 32 to prevent the lid from being raised beyond a convenient working height. The location of the safety stops 109 is shown in FIGS. 4 and 8.

The front edge of the lid 32 also has a shaft 110 extending thereacross (see FIG. 8). The opposite ends of the shaft 110 are connected to locking devices 112 which include cam members 114, and a handle bar 116 connects the locking devices 112. When the lid 32 is closed, the handle bar 115 is moved downwardly in a clockwise direction (FIG. 8) so that the cam members 114 engage roller bearing studs 118 that are positioned adjacent to opposite sides of the frame structure 106. This locks the lid closed on the frame structure 106 and also makes a good seal between the resilient bead 90 and the glass easel 92. When the lid 32 is locked closed with a piece of photosensitive material or printing media positioned on the clear glass easel, the suction pump 98 is energized to evacuate the chamber 94 to make the printing media lie flat as already described.

Figure 4:
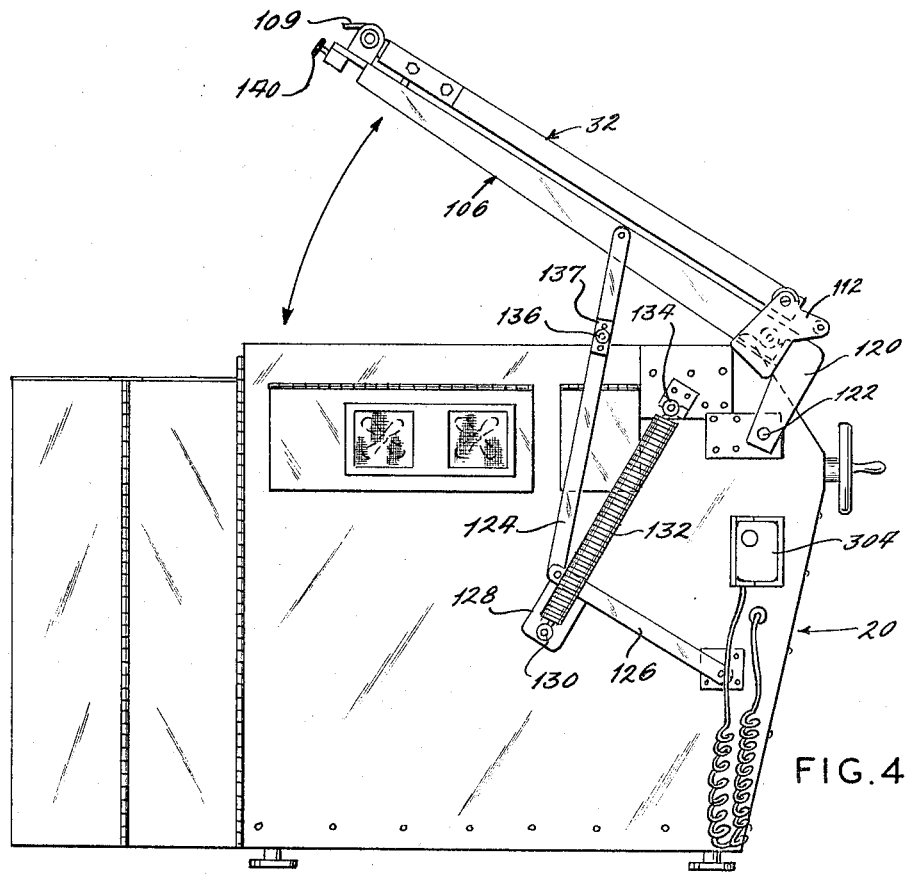
FIG. 4 is a side elevational view showing the machine in another of its open positions for accessibility.

The frame structure 106 which supports the glass top easel 92 is also hinged to the body of the machine along the front edge thereof as shown in FIG. 4. This enables the lid 32 and the frame structure 106 to swing upwardly and forwardly as a unit to provide access into the machine for inserting a film, disconnecting the projector and installing a copy camera adapter on the rear case and for other maintenance and adjustment purposes. In order to open the lid 32 to the position illustrated in FIG. 4, the frame structure 106 is provided with two spaced downwardly extending portions 120 positioned on the sides thereof. The portions 120 are pivotably mounted on studs 122 that extend outwardly from opposite sides of the machine and an arm member 124 is connected on one or both opposite sides of the frame structure 106 at an intermediate location. The arms 124 extend downwardly along the respective sides of the machine and the lower end of each arm 124 is pivotally connected to one end of other arm members 126 which have their opposite ends pivotally connected by suitable means to the associated sides of the machine. The connected ends of the arms 124 and 126 are also connected to pivotal members 128 which have spring engaging studs 130 thereon. One end of a counterbalance spring 132 is attached to the stud 130 on each side of the machine and the opposite ends of the counterbalance springs 132 are engaged with other studs 134 which are attached to the respective sides of the machine. When the lid 32 and the frame structure 106 are moved to the open position as shown in FIG. 4, they can be locked open by a spring biased pin member 136 located in a block 137 that is attached to the arm 124 on one side of the machine. In open position, the pin 136 engages the upper edge of the machine housing and prevents the structure from falling until the pin is withdrawn. If desired, another pin 140 (FIG. 6) can also be mounted on the rear edge of frame structure 106 to lock the frame structure in closed condition. The pin 140 may also be spring biased and cooperates with a hole formed in the rear wall of the housing. It is preferable to have only one locking pin 140 and one supporting pin 136 to make it easier for one person to operate the machine.

Figure 6:
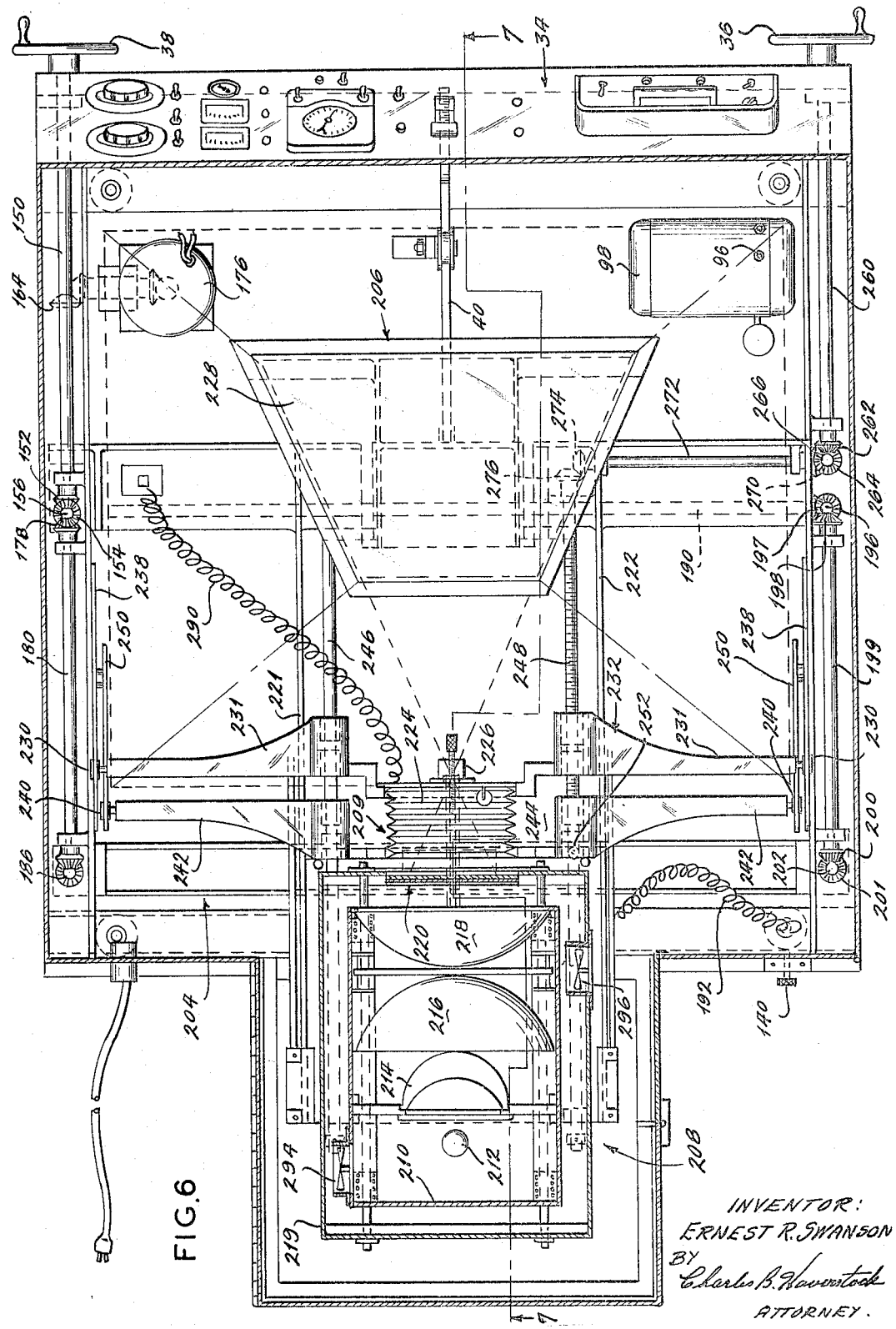
FIG. 6 is a cross-sectional view taken on line 6—6 of FIG. 7.
Figure 7:
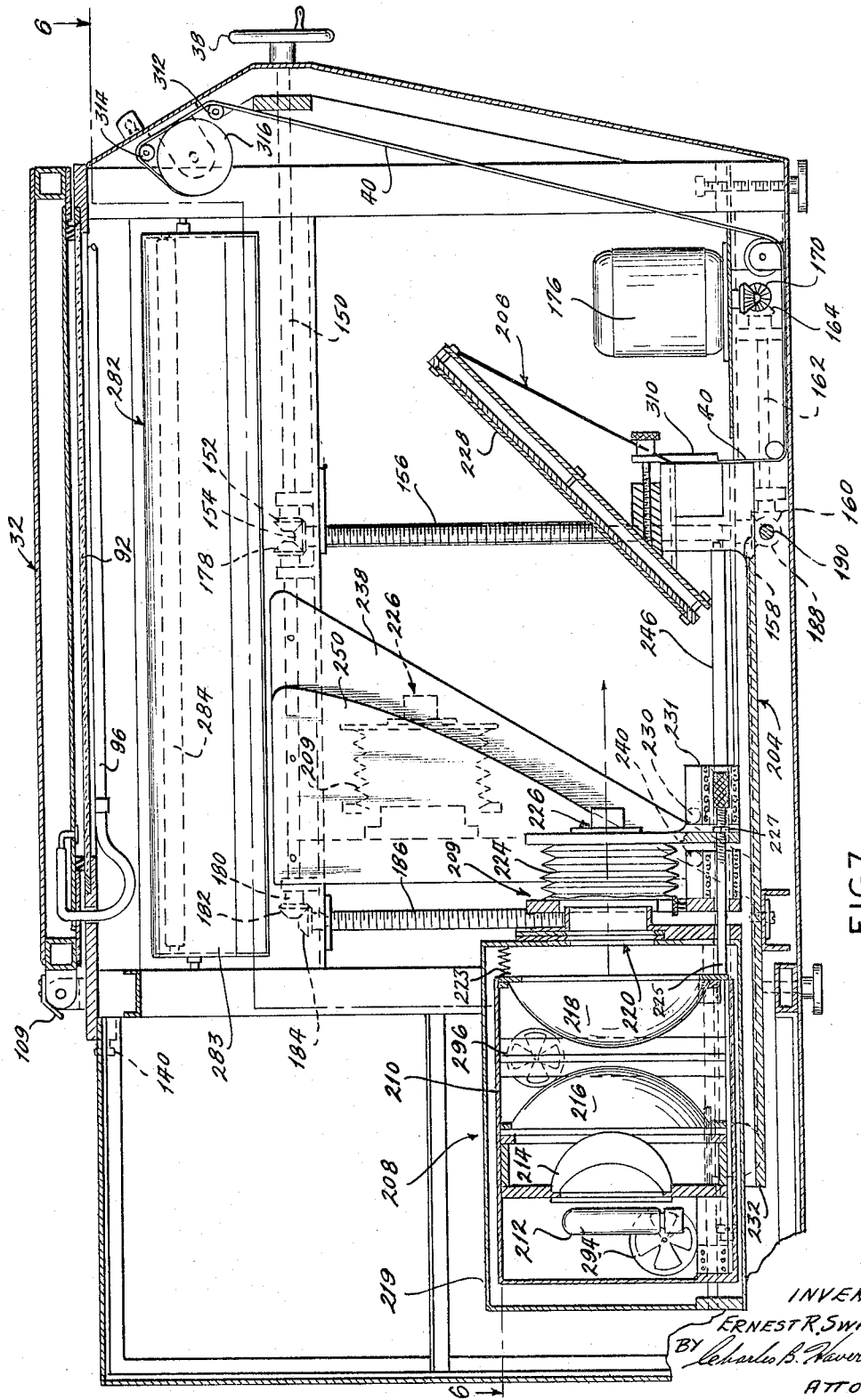
FIG. 7 is a cross-sectional elevational view taken on line 7—7 of FIG. 6.

The operating mechanism for the movable portions of the subject machine are shown in FIGS. 5, 6 and 7. Referring to FIG. 5 there is shown a horizontal shaft 150 on the front end of which is positioned the hand crank 38 that is used to manually adjust the size of an image projected onto the easel 92. The crank 38 is used in conjunction with the graduated tape 40 and the hairline 44 on the control panel 34.

The shaft 150 extends along the right side of the machine and is supported for rotation by suitable bearing members. A bevel gear 152 is attached to the rear end of the shaft 150 and meshes at right angles with another bevel gear 154 located on the upper end of the vertical threaded shaft 156. The vertical shaft 156 extends downwardly along the right side of the machine and has another bevel gear 158 thereon which meshes with a bevel gear 160 located on the rear end of another horizontal shaft 162 (FIG. 7). The shaft 162 extends therefrom toward the front of the machine and has a bevel gear 164 on the front end thereof that meshes with a bevel gear 166 (FIG. 5) on the end of the shorter shaft 168. The opposite end of the shaft 168 also has a bevel gear 170 which meshes with a gear 172 on a shaft 174 which is part of drive motor 176. The drive motor 176 can be selectively operated in either direction of rotation.

In addition to the gears and shafts already mentioned, there are also other shafts and gears which are driven by the motor 176. In FIG. 7, for example, it can be seen that the bevel gear 154 on the upper end of the shaft 156 meshes with a bevel gear 178 on a shaft 180 that extends rearwardly therefrom to the rear right corner of the machine 20. The rear end of the shaft 180 has another bevel gear 182 thereon which meshes with a bevel gear 184 on the upper end of another threaded vertical shaft 186. A check of the shafts and gears will now show that the threaded shafts 150 and 180 rotate in the same direction, and so also do the threaded shafts 156 and 186.

The bevel gear 158 on the bottom end of the shaft 156 meshes with another bevel gear 188 on one end of a horizontal shaft 190 that extends across the bottom of the machine. The shaft 190 has another bevel gear 192 (FIG. 5) on the opposite end thereof that meshes with a bevel gear 194 on the lower end of another threaded vertical shaft 196. The shaft 196 extends upwardly along the left side of the machine and has a bevel gear 197 at its upper end which meshes with a bevel gear 198 on another horizontal shaft 199 that extends rearwardly therefrom along the left side of the machine. The shaft 199 has a bevel gear 200 on the rear end thereof which meshes with a bevel gear 201 on the upper end of yet another vertical threaded shaft 202 at the rear left corner of the machine. The four vertical threaded shafts 156, 186, 196 and 202 are threaded externally, and cooperatively engage a movable main carriage or platform structure 204 which will be described hereinafter. At this point it is sufficient to note that when the crank handle 38 is rotated (or the motor 176 energized) the carriage 204 will be moved vertically by the four threaded shafts. Clutch means (not shown) can also be provided to disengage the crank handle 38 when the motor 176 is operating and vice versa. By supporting the carriage 204 on the four threaded shafts 156, 186, 196 and 202 smooth and uniform movement thereof is assured.

The main carriage 204 supports a mirror structure 206, a projector 208, a lens and bellows structure 209, and a rear case 211 for copy camera adapter 285 all of which will be described in detail hereinafter.

The projector 208 is clearly shown in FIGS. 6 and 7 and includes an inner housing 210 in which are positioned a projector bulb 212 and a plurality of lenses shown as lenses 214, 216 and 218. Suitable support and mounting means are also provided for these elements in the inner housing 210. The projector 208 also has an outer housing 219 which is slideably supported on the main carriage 204 by suitable slides 221 and 222. A film magazine 220 is attached to the front end of the housing 219.

It is also desirable to have the inner housing 210 adjustable relative to the outer housing to be able to produce the most desirable operating condition for the projector. This adjustment is obtained by having a spring 223 connected between the housing portions 210 and 219 (FIGS. 7 and 11), and a member 225 threadedly connected to the carriage 232. The member 225 extends through a hole in the front wall of the outer housing 219 when the projector is in operating position and abuts the front wall of the inner housing 210 to accurately position it. The adjustment can be changed by loosening a lock nut 227.

The bellows structure 209 is positioned between the projector 208 and the mirror structure 206 and includes an expandible bellows 224 and an object lens system 226 mounted on front thereof in the path of light coming from the projector bulb 212. The light from the projector bulb 212 passes through the lenses 214, 216 and 218, through a film positioned in the film magazine 220, through the bellows structure 209 which includes means for attaching it to the film magazine 220, through an electrically operated shutter device positioned inside the bellows structure (not shown), and is focused on the glass easel 92 after being reflected upwardly by the mirror structure 206 by adjusting the position or the relative position of the film chamber 220 and the object lens system 226. The mirror structure 206 includes a mirror 228 tilted at an angle of approximately 45° and shaped as shown.

The crank 38, or the motor 176, as already described, is operated to raise or lower the main carriage 204 by rotating the threaded shafts 156, 186, 196 and 202 therein. At the same time that the main carriage 204 is being moved, the projector 208 is also moved horizontally on the carriage 204 under control of suitable cam and cam follower means. The cam and cam follower means are provided to maintain a proper spacing between the projector 208 and the mirror 228 for each position of the carriage 204 and to make adjustments for changes in the size of the image projected on the glass easel 92. A second pair of cam and cam follower means are also provided, and when used automatically, focus the projected image or copy camera, as the case may be, on the glass easel 92. This is accomplished by adjusting the position of the film chamber 220 (or copy camera) relative to the object lens system 226 and is necessary because the focusing of the object lens system does not change in the same relationship as the size of the projected image. The mirror structure 206 is fixedly mounted on the carriage 204 and does not move relative thereto.

Figures 11, 12:
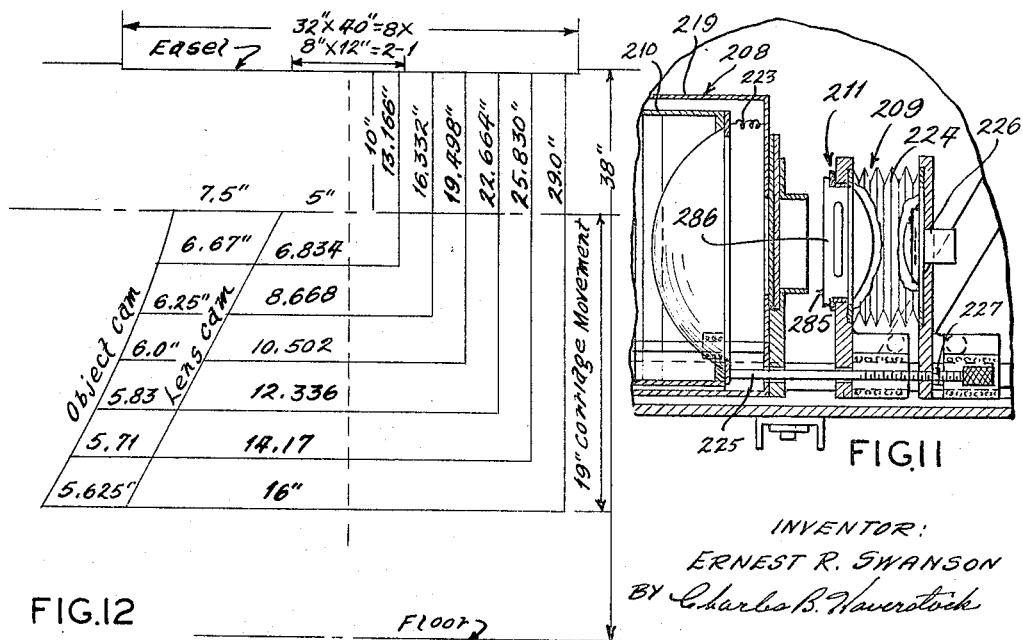
FIG. 11 is an enlarged fragmentary view of the bellows structure portion in the subject device shown connected to a copy camera adapter and a copy camera.
FIG. 12 is a graph showing the automatic focusing relationship between the object cam and the lens cam in terms of the size of the image enlargement.

The cam means provided for repositioning the projector 208 relative to the mirror 228 are shown in FIGS. 6 and 7, and include two similar rotatable cam follower members 230 which are mounted adjacent opposite sides of the machine on similar arm members 231 which are part of a movable projector carriage 232. The projector carriage 232 is slideably supported on the main carriage 204 on the spaced horizontal guide rails 221 and 222. The cam followers 230 engage similar cam members 238 positoned adjacent opposite sides of the machine, which cam members extend substantially the full operating heighth of the machine. The cam followers 230 are biased rearwardly into engagement with the associated cams 238 by suitable means such as spring or hydraulic means, and when the main carriage 204 is raised or lowered the cam followers 230 roll on the associated cams 238 to automatically reposition the projector 208 or copy camera relative to the mirror structure 206. As already noted, this changes the size of the image projected on the glass top easel 92. When the projector 208 is not being used it is disconnected from the bellows structure 209 and slid back out of the way on the rails 221 and 222. It is then possible to connect the copy camera 285 to the copy camera adapter 211 as shown in FIG. 11. The copy camera is adjusted and focused the same as the projector but is operated as a camera instead of a projector.

The cam means for auto focusing the projector or copy camera include another pair of cam follower members 240 mounted on opposite ends of other arm members 242. The arm members 242 are part of a focusing slide or object carriage 244 which is horizontally slideable on spaced guide rods 246 and 248 (FIGS. 6 and 7). The object carriage 244 supports the film magazine 220 or the copy camera when it is used and moves the said members back and forth relative to the object lens system 226. The cam follower members 240 are biased into engagement with associated fixed cam members 250 located adjacent opposite sides of the machine, and continuously and automatically adjust the focusing during vertical movement of the main carriage 204. The cam members 250 are formed to automatically maintain a proper focus relationship between the projector 208 or copy camera and the glass easel 92 in all positions of the carriage 204 and the cams 250 are designed for a particular lens system. However, if additional or sharper focusing is required for some reason, or if another object lens system is used, the auto-focusing means can be disengaged and manual focusing provided. The means for disconnecting the auto-focus cam followers include removing the cam followers 240 from the arms 242. Thereafter manual focusing is obtained by operating a locking device or button 252 mounted on one of the arms 242 to threadedly engage the object carriage 244 with the threaded horizontal shaft 248. The shaft 248 is rotated by the manual focus crank 36 and when rotated repositions the carriage 244 relative to the object lens 226. Therefore, it can be seen that when the machine is set for auto-focusing the crank 36 is inoperative and the object carriage 244 slides on the shafts 246 and 248 and when the machine is set for manual focusing the crank 36 is threadedly engaged with the object carriage 244 by means of the button 252 as described. The manual focus crank 36 therefore enables the machine to be used with many different object lens systems and is not limited to the particular lens system that matches the cams 250.

The entire bellows structure 209, including the object lens system 226 and the projector or copy camera are therefore mounted for movement under control of the cams 238, and the rear end of the bellows structure 209 including the projector or copy camera attached thereto is also under control of the auto-focus cam means or the crank 36. Wing nuts or other threaded means are also provided for attaching the bellows to the projector or to the copy camera adapter.

The manual crank 36 is mounted on the forward end of a shaft 260, and the rear end of the shaft 260 has a bevel gear 262 thereon which meshes with another bevel gear 264 on the upper end of a threaded vertical shaft 266 which has a slot 267 on one side thereof. The shaft 266 extends downwardly along the left side of the machine and is mounted in a ball bearing at its lower end. A bevel gear 268 is keyed on the slotted shaft 266 and meshes with another bevel gear 270 on a horizontal shaft 272 that extends therefrom toward the center of the machine. The shaft 272 has another bevel gear 274 on the opposite end thereof which meshes with a bevel gear 276 on the forward end of the horizontal threaded shaft 248. The shaft 248 is journaled to the main carriage 204 and extends rearwardly thereon to slideably or threadedly cooperate with the object carriage 244. For automatic focusing, the carriage 244 slides on the shafts 246 and 248 and for manual focusing the button 252 is operated to engage a threaded half-nut with the threaded shaft 248. The cam rollers 240 are also removed for manual focusing as aforesaid. Thus it can be seen that focusing is accomplished by moving the film magazine and the attached projector or the copy camera and copy camera adapter which are mounted on the object carriage 244 relative to the object lens system 226 which is mounted on the main carriage 204.

The vertical shaft 266 is slotted at 267 as shown in FIG. 5 to allow the bevel gear 268 which is keyed thereto to slide up and down thereon during vertical movement of the main carriage 204 so that manual focusing can be accomplished at all elevations of the main carriage 204.

A copy light assembly 282 is mounted along two sides of the machine near the top as shown in FIGS. 5 and 7. Each copy light assembly includes a reflector shield 283 and suitable bulb means 284. The copy light assemblies 282 are used to expose a sheet of photosensitive paper or the like to an image to be reproduced or photographed and the reflectors are provided to evenly distribute the reflected light therefrom over the glass easel 92. The copy lights 282 can be used for making photocopies and also for illuminating an image to be photographed by a copy camera 285.

The copy camera adapter 285 includes a film holder 286 (FIG. 11) which is attached to the rear case 211 and the rear case is connected to the rear end of the bellows structure 209. The copy camera adapter 285 is used in place of the projector 208. The copy camera adapter 285 is also mounted on the object carriage 244 as already mentioned.

The copy lights 284 are under control of the copy light switch 56 and the rheostat 62 and the rheostat 62 is used to vary the copy light intensity produced thereby. This is similar to the projector bulb 212 which is under control of the switch 60 and the rheostat 63. The voltmeters 54 and 58 are also provided as aforesaid to give readings of the applied intensities of the associated lights.

A solenoid operated shutter device (not shown) is mounted inside the bellows 224 and is connected by a flexible cable 290 (FIG. 6) to an operating circuit actuated from the control panel. The flexible cable 290 supplies power to operate the shutter in the various operating positions of the lens carriage. A similar flexible cable 292 is also connected to the projector 208 to provide power for operating the projector lamp 212. Another flexible cable under control of the master switch 64 provides power for operating fans 294 and 296 mounted thereon. Other fans 298 and 300 are also controlled by the master switch 64 and are mounted in the side walls of the machine to exhause heat generated by the copy lights 282 and to cool the machine. All fan units are provided with filters 302.

A light sensitive instrument 304 is attached to one side of the machine by a flexible cable 306, and is used as shown in FIG. 3, to measure the light intensity at various locations over the glass top 92. The light sensitive instrument 304 is connected to the exposure meter 50 on the control panel and records light intensity on the dial portion thereof. It is important to know the light intensity in order to properly adjust the shutter opening and speed for each different photosensitive material employed. The instrument 304 is positioned in a bracket assembly 308 on the side of the machine when not in use.

The ratio meter tape 40 is used to indicate the reduction and enlargement ratio and is attached at it slower end to an adjustable bracket 310 mounted to the main carriage 204. The tape 40 extends therefrom around two spaced guide rollers 312 and 314 (FIG. 7) and is attached at its upper end to a spool 316 which is spring loaded to maintain tension on the tape 40. The portion of the tape 40 between the guide rollers 312 and 314 passes in front of the opening 42 in the control panel as the main carriage is raised and lowered, and the tape is graduated so that it can be read by the operator when he is adjusting the size of an image to be reproduced.

When the subject machine is operated as a projector the projector housing 219 with the attached film stage is moved forward and connected to the rear case 211 of the object carriage. The film stage is thereby also connected to the outer projector housing 219. With the film positioned in the film holder 220 and slideably inserted into the film stage, the machine is then energized by actuating the master switch 64 which energizes all the fan units and supplies power to the various control circuits. The projector bulb can now be energized by the switch 60 and its intensity can be adjusted using the rheostat 63. The shutter is also energized to its open position. The image or picture on the film 220 is now projected forwardly and reflected upwardly by the mirror 228 onto the glass easel 92. If the auto-focus mechanism is in operation, the image may be enlarged or reduced by pressing switch 46 or 48, but if manual focusing is required this is accomplished in the manner already described after disengaging the object carriage cam followers 240 and engaging the half-nut 252 on the object carriage with the lead screw 248. The projected image can be viewed when the lid 32 is open by placing a translucent or frosted film on the easel 92 or the image can be projected onto a photo-sensitive media positioned thereon and reproduced. If the image on the easel 92 is the wrong size it can be enlarged by pressing the switch 48 to energize the motor 176 and lower the main carriage 204 or reduced in similar manner using the switch 46. It can also be manually adjusted as to size by using the crank 38. The crank 38 is usually employed for fine adjustment although it can be used for total adjustment if desired.

After the image size has been set, the light intensity instrument 304 is used to adjust and read the light intensity in order to know what exposure to use for a particular photosensitive material. This reading will vary with the intensity of the project bulb 212 or copy lights 284 as the case may be and will be used to determine the lens opening and shutter speed. With the machine now set for making a reproduction from a film using the projector 208, a piece of photosensitive medium is placed on the glass top easel 92, the lid 32 is closed, and the suction pump 98 energized to evacuate the chamber 94 and flatten the photosensitive medium against the glass top 92. The timer 52 is now set for the desired exposure time as determined by the information already known. The shutter controls including the switches 66 and 68 are then actuated to energize the solenoid controlled shutter located in back of the lens inside of the bellows 224. The shutter control operates in conjunction with the timer 52 when exposing a light sensitive member. When the exposure has been completed, the lid 32 is reopened by de-energizing the suction pump 98 and releasing the suction pressure using the release button 74. The exposed photosensitive medium is now ready to be developed in a conventional or electrophotographic processor.

As already noted, a frosted film can also be placed on the glass top 92 for viewing purposes and for many other special purposes including compilation and drawing applications other than simply making photocopies.

To make a contact exposure move the machine to its lowest or maximum enlargement position, remove the film holder from the projector and after measuring the light intensity using the meter 304, place the film on the glass easel with a photosensitive medium thereon, then merely close and evacuate the lid. The projector light is then energized for a controlled exposure time interval and thereafter the photosensitive medium is processed to produce the finished copy.

FIG. 12 is a graph showing the relationships between the object lens, the film stage and the glass easel for various ratios of enlargements and reductions. FIG. 12 also graphically illustrates the relative size of an image appearing on the easel 92 for various preselected positions of the main carriage 204. The particular positions shown are for illustrative purposes only since it is possible to obtain all other image sizes within the range of the machine.

The operation of the copy camera 285 is similar to the operation of the projector except that the copy camera 285 makes use of the copy light assemblies 282 to provide the light for exposing the film in the camera. The intensity of light produced by the copy lights is again obtained using the instrument 304. The copy camera can also be focused automatically or manually using the same cam means or crank means provided for focusing the projector as described above. After the camera has been positioned by means of the ratio meter so as to cover the image to be photographed and the intensity of the copy lights set, a film holder containing the film to be exposed is inserted in the camera adapter and the image to be photographed is placed on the glass easel in proper position, the lid 32 is closed, and the suction pump 48 energized. After withdrawing the dark slide from the film holder the copy camera is then operated using the same shutter mechanism provided in conjunction with the projector. The copy camera 285 therefore provides a very accurate way of photographing images, and the films thus produced can then be used to later make other copies or for viewing purposes using the projector 208.

Thus there has been shown and described a novel flexible and versatile photoreproducing machine capable of operation as a copy camera, a projector, a contact printer, a viewer, an enlarger or reducer, and for many other purposes, which machine fulfills all of the many objects and advantages sought therefor. The subject machine also provides extremely accurate means for performing all of the above functions. Briefly, the machine comprises a housing with a vertically movable carriage or platform mounted therein, a mirror structure, a projector, an object lens, and camera adapter means arranged in spaced optical communication on the carriage and capable of projecting or being exposed to an image on a surface positioned thereabove, means for vertically moving the carriage in the housing to change the image size, means for repositioning the projector or copy camera relative to the mirror structure during said vertical carriage movement, and other means for focusing the projector or copy camera in each position of said carriage. The subject device also includes light intensity measuring means, exposure adjusting means, timing means, shutter means, illuminating means for copying purposes, and adapter means for alternatively using the machine as a copy camera and a projector. The subject device also includes means for maintaining a photosensitive member in a preselected condition during exposure thereof to an image reflected, projected or contacted thereby.

It can thus be seen that the subject invention discloses a novel versatile machine capable of performing many different photographic operations and capable of being adjusted automatically or manually as required.

Many changes, modifications, variations and other uses and purposes for the subject device will become apparent to those skilled in the art after considering this specification and the accompanying drawings which describe and show a preferred form of the device. All such changes, modifications, variations and other uses and purposes of the device which do not depart from the spirit and scope of the invention are deemed covered by the invention which is limited only by the claims which follow.

What is claimed is:

1. A photoreproducing machine comprising a housing, a transparent wall on said housing, means for covering said wall to prevent ambient light from entering the machine, a platform structure positioned in the housing, means for moving the platform structure toward and away from the transparent wall, a movable carriage mounted on said platform structure, a projector including a light source, a film stage and a lens system mounted on said carriage, said light source and said lens system being movable relative to the film stage, and a mirror mounted on the platform structure in spaced relationship to said projector and in position to reflect light from the projector onto the transparent wall, means for moving the carriage relative to the platform structure to change the spacing between the projector light source and lens system and the mirror in response to movements of the platform relative to the transparent wall for changing the size of the image projected on the transparent wall, and other means for simultaneously moving the projector film stage relative to the projector lens system to keep the image from the projector focused on the transparent wall in all positions of the platform structure.

2. The photoreproducing machine described in claim 1 wherein said means for moving the projector light source and lens system include cooperating cam and cam follower members, one of which members is attached to the housing and the other to the movable carriage.

3. A photoreproducing machine comprising a housing, a transparent wall on the housing, a lid movable between a closed position covering the transparent wall and an open position exposing said transparent wall, a carriage structure mounted in the housing, means for moving the carriage structure toward or away from the transparent wall, a mirror, a projector including a light source, a lens system and a film holder mounted in spaced relation on the carriage, said mirror being positioned to reflect light from the projector toward the transparent wall, means for automatically and predeterminately changing the spacing between the projector and the mirror during movement of the carriage structure, and other means for automatically adjusting the position of the film holder relative to the projector light source and lens system during movement of the carriage structure to maintain the projector focused on the transparent wall.

4. The photoreproducing machine defined in claim 3 wherein said means for automatically changing the space between the projector and the mirror include first cam means for moving the projector relative to the carriage structure, and second cam means for moving the film holder relative to the projector light source and lens system, and indicator means connected to said carriage structure including means calibrated to read the size of the image projected on the transparent wall for every position of the carriage structure in the housing.

5. The photoreproducing machine defined in claim 3 including manual focus control means, and means enabling said manual focus control means to be operated in every position of the carriage structure said last named means including means for disengaging the means which automatically change the spacing between the projector and the mirror.

6. A multipurpose photoreproducing machine capable of projecting, enlarging, copying, photographing, and being used as a viewer comprising a housing having a transparent wall on one side, means movable between an open position exposing the transparent wall to view and a closed position isolating said wall from view, a main carriage positioned in said housing, means for moving said main carriage toward or away from the transparent wall, a mirror and a film stage mounted in spaced relationship on the main carriage, said mirror being positioned in optical communication with the film stage and with the transparent wall, said film stage selectively including projector means or copy camera means, means automatically moving the film stage relative to the mirror when the main carriage moves to change the size of the area on the transparent wall in optical communication therewith, movable lens means mounted on the carriage means, and other means for automatically moving the lens means relative to the film stage in response to movements of the main carriage to maintain the projector or copy camera focused on the transparent wall.

7. The multipurpose machine of claim 6 wherein said means for moving the lens means include cooperatively engaged autofocus cam and cam follower members movable relative to each other in response to movements of the main carriage, one of said members being operatively connected to the lens means.

8. The multipurpose machine of claim 7 including means for disengaging the autofocus cam and cam follower members and other means for manually adjusting the poistion of the lens means when the autofocus cam and cam follower members are disengaged.

9. A multipurpose machine comprising a closed housing having a chamber therein and a light conducting wall on one side, closure means for optically covering said wall, said closure means being movable to an alternate position exposing said wall to view, means for selectively photographing or projecting an image on the light conducting wall including a carriage positioned in the housing, means for moving the carriage toward or away from the light conducting wall, a mirror and a film stage positioned on the carriage in spaced relationship and in optical communication with each other and with the light conducting wall, means for automatically moving the film stage relative to the mirror in response to movements of the carriage relative to the light conducting wall, and other means for focusing the film stage on the light conducting wall, said other means including a lens mounted on the carriage between the film stage and the mirror, and means for moving the lens relative to the film stage in response to movement of the carriage.

10. The multipurpose machine defined in claim 9 wherein said film stage includes adapter means selectively engageable with a projector structure or a camera structure.

11. The multipurpose machine defined in claim 9 wherein illumination means are mounted in said housing adjacent to the light conducting wall, said illumination means including means for relatively uniformly illuminating said light conducting wall.

12. The multipurpose machine defined in claim 9 wherein said light conducting wall is translucent.

13. A multipurpose machine comprising a closed housing having a chamber therein and a light conducting wall on one side, closure means for optically covering said wall and to prevent light from getting into the machine, said closure means being movable to an alternate position exposing said wall, means for selectively photographing or projecting an image on the light conducting wall including a carriage positioned in the housing, means for moving the carriage toward or away from the light conducting wall, a mirror and a film stage positioned on the carriage in spaced relationship and in optical communication with each other and with the light conducting wall, an object lens system including an object lens and an expandible bellows positioned in optical communication between the film stage and the mirror, means for automatically moving the film stage relative to the mirror in response to movements of the carriage to change the area of the light conducting wall in communication with the film stage, and other means for focusing the film stage on the light conducting wall, said last named means including an object carriage supporting the object lens for movement relative to the film stage in response to movements of the carriage relative to the light conducting wall.

14. The multipurpose machine defined in claim 13 wherein said focusing means includes cooperatively engaged cam and cam follower members, one member of which is connected to the object carriage and the other member of which is connected to the housing.

15. The multipurpose machine defined in claim 13 wherein said focusing means include means for making movements of the object carriage independent of the carriage, and other means including manual means for adjusting the position of said object carriage relative to the aforesaid carriage, said manual means including a crank and means threadedly connecting said crank to the object carriage.

16. The multipurpose machine defined in claim 14 including manual focus control means engageable with said object carriage, said manual focus control means including means for disengaging the cam and cam follower members and operator means threadedly engageable with the object carriage.

17. In a photoreproducing machine comprising a housing having a chamber therein and a transparent wall on one side, the improvement comprising a closure member mounted adjacent to said transparent wall and movable between an open position exposing said wall and a closed position concealing said wall and optically shielding the housing chamber, said closure members having a flexible portion positioned adjacent to the transparent wall in the closed positions thereof, means on said closure member engageable with said transparent wall to form a sealed chamber between the flexible portion and the transparent wall in the said closed position, and means for evacuating said sealed chamber to make the flexible portion move into intimate contact with the transparent wall.

18. In the photoreproducing machine of claim 17 said closure member includes means hinging it to the housing along one side of the transparent wall, yieldable means for maintaining said closure member in open position exposing the transparent wall, means on the closure member engageable with cooperative means on the housing to maintain the closure member in closed position and other means hingedly connecting the closure member to the housing on the opposite side of the transparent wall from the aforesaid hinging means, said last named hingedly connecting means enabling the closure member and the transparent wall to be raised as a unit on the housing to provide access into the housing.

References Cited by the Examiner

UNITED STATES PATENTS

| | | | |
|---|---|---|---|
| 2,137,028 | 11/1938 | Rau | 88—24 |
| 2,437,898 | 3/1948 | Swanson | 88—24 |
| 2,827,833 | 3/1958 | Nieth | 88—24 |

NORTON ANSHER, *Primary Examiner.*

R. A. WINTERCORN, *Assistant Examiner.*